United States Patent [19]

Caldwell

[11] Patent Number: 5,644,624
[45] Date of Patent: Jul. 1, 1997

[54] AUTOMATIC TELEPHONE CALL ORIGINATION AND RETRY SYSTEM AND METHOD OF OPERATION

[75] Inventor: Holley G. Caldwell, Phenix City, Ala.

[73] Assignee: Caldwell Communications Development, Inc., Phenix City, Ala.

[21] Appl. No.: 437,601

[22] Filed: May 9, 1995

Related U.S. Application Data

[63] Continuation of Ser. No. 247,553, May 23, 1994, abandoned.

[51] Int. Cl.⁶ .................................................. H04M 1/27
[52] U.S. Cl. ........................ 379/69; 379/67; 379/209; 379/399
[58] Field of Search ........................ 379/67, 69, 70, 379/88, 89, 92, 93, 111, 112, 133, 136, 139, 209, 216, 266, 355, 265, 309, 377, 396, 399

[56] References Cited

U.S. PATENT DOCUMENTS

| | | | |
|---|---|---|---|
| 3,445,601 | 5/1969 | Whitely et al. | 379/69 |
| 3,943,289 | 3/1976 | Sheldon et al. | 379/69 |
| 4,143,243 | 3/1979 | Sutton | 379/69 |
| 4,188,510 | 2/1980 | Bower et al. | 379/69 |
| 4,406,925 | 9/1983 | Jordan et al. | 379/69 X |
| 4,438,296 | 3/1984 | Smith | 379/69 |
| 4,492,820 | 1/1985 | Kennard et al. | 379/69 |
| 4,712,230 | 12/1987 | Rice et al. | 379/112 |
| 4,737,981 | 4/1988 | Hoberman et al. | 379/112 |
| 4,941,168 | 7/1990 | Kelly, Jr. | 379/69 |
| 4,998,272 | 3/1991 | Hawkins, Jr. et al. | 379/88 |
| 5,268,957 | 12/1993 | Albrecht | 379/67 |
| 5,422,937 | 6/1995 | Ferrara | 379/88 |
| 5,425,091 | 6/1995 | Josephs | 379/201 |

FOREIGN PATENT DOCUMENTS

| | | | |
|---|---|---|---|
| 0204674 | 12/1982 | Japan | 379/69 |
| 0144953 | 7/1986 | Japan | 379/69 |
| 0251847 | 10/1989 | Japan | 379/69 |
| 02042857 | 2/1990 | Japan | 379/88 |
| 2238208 | 5/1991 | United Kingdom | 379/69 |
| 9208039 | 5/1942 | WIPO | 379/69 |

OTHER PUBLICATIONS

"PC Dial Log by CMC" Operations Manual, 1983 pp. 1-1 to 2-12.

"High Tech Phone Does the Dialing" The Journal [of Fairfax Virginia], Aug. 1992. Andy Pargh.

"Assurance of Copied Calendar Event Notification via Phone Messages" IBM Technical Disclosure Bulletin, vol. 36, No. 09B, Sep. 1993.

*Primary Examiner*—Ahmad F. Matar
*Assistant Examiner*—Scott L. Weaver
*Attorney, Agent, or Firm*—John C. Garvin, Jr.; James E. Staudt

[57] ABSTRACT

A system and method in which the user is provided the option of automatic recall of selected numbers which have been previously called. The computer based system which is controlled by operation of a conventional push-button telephone repeatedly places selected calls and plays a selected prerecorded message whenever a call is answered. Processors provide the capability of recognizing the results of each call as to whether the call has reached a number which is busy or is answered, and also as to whether the call is answered by a person or by an answering machine. In response to recognition signals, the system, at the appropriate time, plays a selected message. When a call has been successfully completed the called number will be removed from a numbers queue within the system, and the system will record the time and date of the completion. Numbers remaining in the queue will be recalled until successfully completed. The number of unsuccessful recalls, and the time at which each was made, is also recorded by the system. The system is programmable to make calls during selected time periods. A display panel provides information relating to operation of the system.

4 Claims, 3 Drawing Sheets

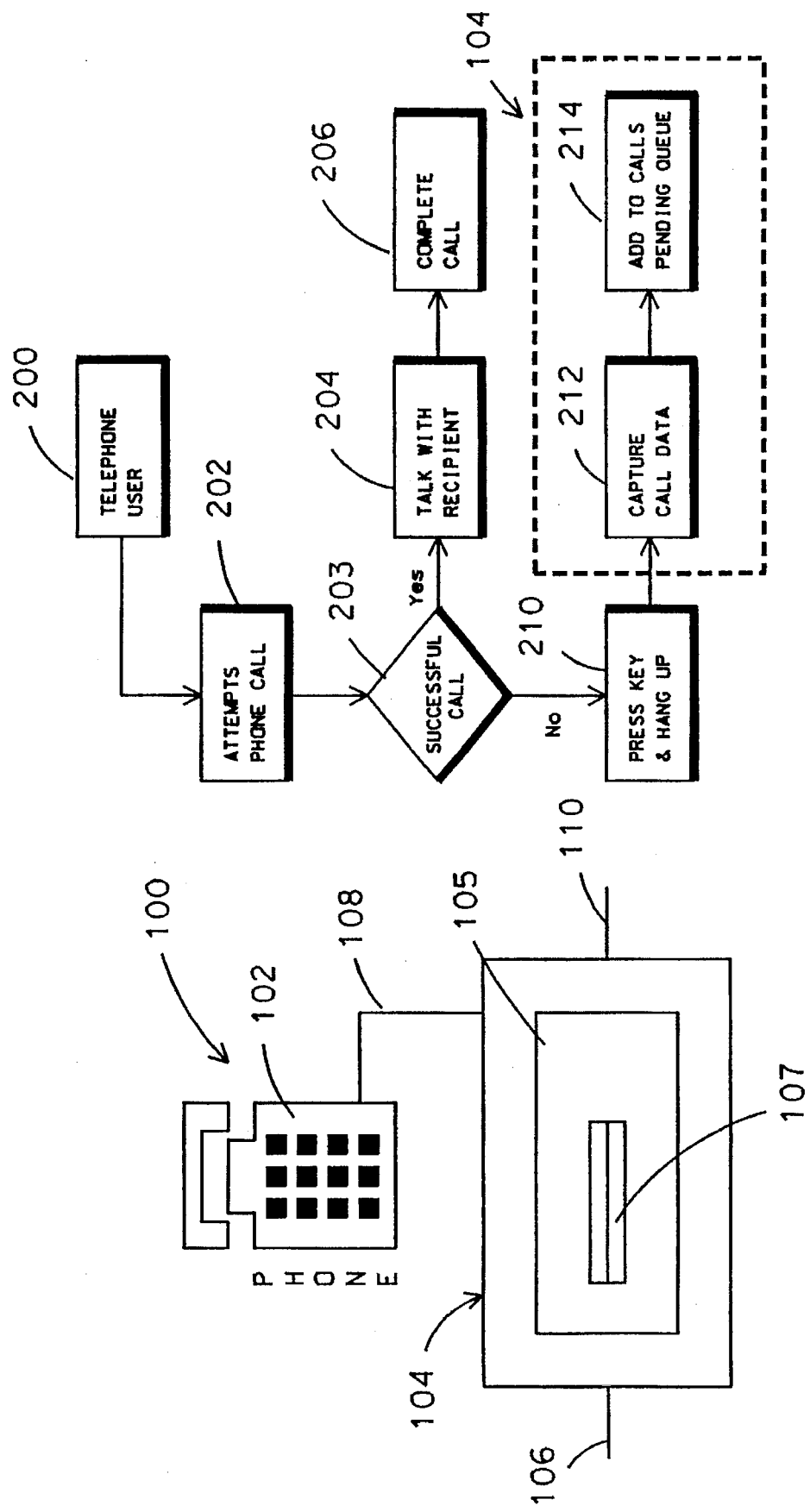

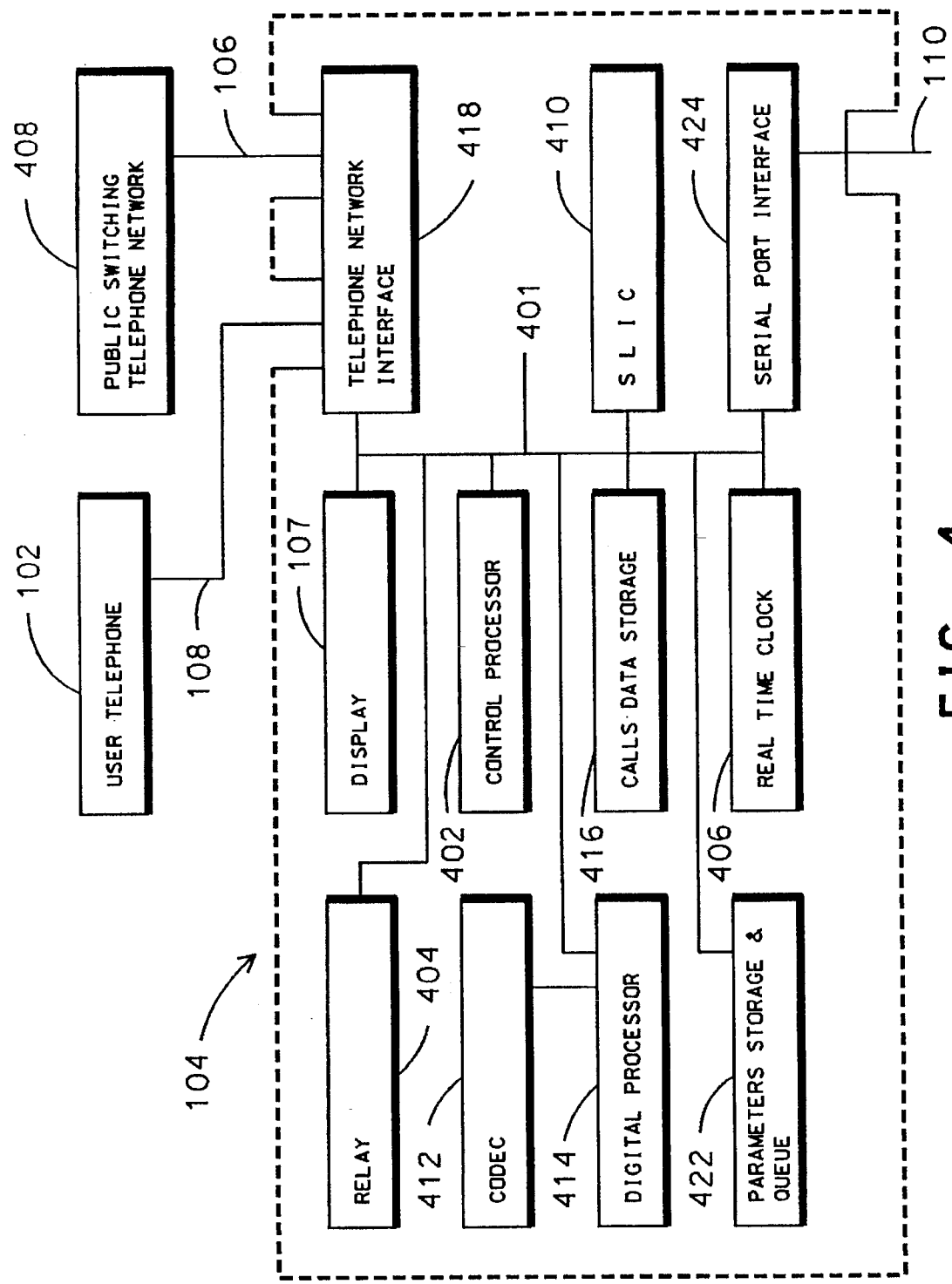

AUTOMATIC TELEPHONE CALL ORIGINATION AND RETRY SYSTEM AND METHOD OF OPERATION

This is a continuation in part of application Ser. No. 08/247,553 filed May 23, 1994, now abandoned.

TECHNICAL FIELD OF THE INVENTION

This invention relates generally to the field of automatic telephone calling equipment and relates specifically to a system for automatic recall of selected telephone numbers to which a call has been made but which call was unsuccessful.

BACKGROUND OF THE INVENTION

It is quite common for a telephone call to be completed to the number dialed, but be unsuccessful in the sense that the intended recipient is not available to take the call. When this occurs the caller will typically leave a message requesting the intended recipient to return the call. When the call is returned the original caller's telephone may be busy or unanswered. Under these circumstances the original caller is not aware that the intended recipient of the original call has received the message and has attempted to return the call. It is often important that the original caller be made aware that an attempt has been made to return the call. It is also common for a telephone call to be unsuccessful because the number being called is busy or the telephone is unanswered. The end result in either of these circumstances is the same in that, typically, one must spend a considerable amount of time attempting to complete a call to a particular individual. While these scenarios always create problems, the problems are greatly magnified when they occur in the business or professional world, wherein time is measured in terms of money, and good public relations are imperative.

An example of the attempted return of a call occurs when an animal owner has a pet in a medical care unit and calls to ask the care provider personally about the animal's condition. The care provider is busy and a note is taken to call the pet owner. When the care provider places the call, the telephone may be busy or unanswered, thus the individual being called cannot be reached.

An example of attempts at original calls is illustrated by the case of a real estate agent who must contact a client within a short time in order to consummate a sale. The agent tries to call the client only to receive a busy signal or no answer. If the agent is to reach the client he/she must continue to try to call the client. Failure to reach the client can often mean a lost sale, as well as a lost client. Of similar concern is the serious public relations situation that occurs if the client is not contacted and chooses to relate the incident to others who may be customers or potential customers. Other examples occur when clients call for a particular individual in need of personal information regarding important matters such as health, finance or legal matters.

Thus a need exists to provide an automated telephone system for accomplishing the time consuming task of repeatedly placing selected calls until the calls are successfully completed. That is to say, the calls have either reached the individual being called or an appropriate message has been provided.

Upon trying only once to return or place a call, the present invention will repeat the call until it is completed. At that time, a recorded message is played to the person or machine answering the call. The message may inform the recipient that an attempt has been made to return the call at the time and date recorded by the system, or it may provide whatever information is desired. This system takes no effort on the part of the user other than an initial call attempt and activation of the system.

The result of having such a system is that without an additional expenditure of time on the part of the caller, the intended recipient will receive the caller's message at the earliest possible time. This translates to greater customer interaction and satisfaction and less effort and time "wasted" on the part of the caller.

Examples of related prior art are found in U.S. Pat. Nos. 3,943,289 to Sheldon et al, 4,712,230 to Rice et al; in British patent GB 2,238,208 to Dawson; in publication bulletin titled "Assurance of Copied Calendar Event Notification via Telephone Messages" which appears in IBM Technical Bulletin, Vol. 36, No. 09B, September 1993; in an article titled "High-Tech Telephone does the Dialing" by Andy Pargh, published in "The Journal" [of Pairfax Va.] August, 1992; and in International Publication Number WO 92/08309 by Dibianca, published under the Patent Cooperation Treaty. While the devices described in the prior art relate to automatic dialing of telephone numbers none is adapted for attachment to a conventional telephone wherein each number dialed on the telephone is automatically stored for future recall and without further programming may be selected for recall by a single operator action.

SUMMARY OF THE INVENTION

Accordingly, the objectives of the present invention are to overcome the above described problems, as well as other problems relating to automatic calling systems. It is therefore an object of this invention to provide a calling system for the automatic and repeated recall of selected telephone calls which have failed initially to reach a particular individual or an answering machine. Of paramount importance is the fact that the automatic operation of this system is typically actuated by depression of a single key on the keypad of a conventional telephone to which the system has been attached. Accordingly, after an initial call is made no reentry of the called number is required as with previous automatic calling systems. This invention provides a system and method of operation which utilizes a computer based means for repeatedly placing calls and for providing a message selected by the caller whenever a call is answered. The system may be operated at the command of the user and will also operate automatically when unattended.

The invention consists of a control box which is connected to an individual telephone in a manner similar to that of a typical telephone answering machine. This means that the user of this system connects an incoming telephone line to the control box and connects the telephone to the same control box. Operations of the system are controlled from the telephone keypad. The system utilizes DTMF tone detection, energy level status information, voice compression and an echo canceler to allow the receive energy level signal to be monitored during call playback. These functions are provided by use of well known components which will be identified and described in detail hereinafter. These components are controlled by use of simple commands provided by the manufactures, and are easily utilized by persons having ordinary skill in the art. Typically, a control box contains all circuitry and displays required to operate the system as directed by commands from the telephone key pad. The system is also well suited for use within a private-branch-exchange (PBX). Accessory components such as a printer or computer modem may also be attached to the control box. These accessories may be used to provide lists of pending or completed calls. A display panel provides information relating to the operational status of the system as well as helpful information relating to parameters selection for customized use of the system.

BRIEF DESCRIPTION OF THE DRAWINGS

FIG. 1 illustrates the basic components of the present invention as attached to a conventional telephone and to an incoming telephone line.

FIG. 2 illustrates a logic flow chart of a call procedure followed when telephone calls are being attempted.

FIG. 4 is a block diagram which illustrates the interconnection of the components of the present invention.

DETAILED DESCRIPTION OF THE INVENTION

Figure 3:
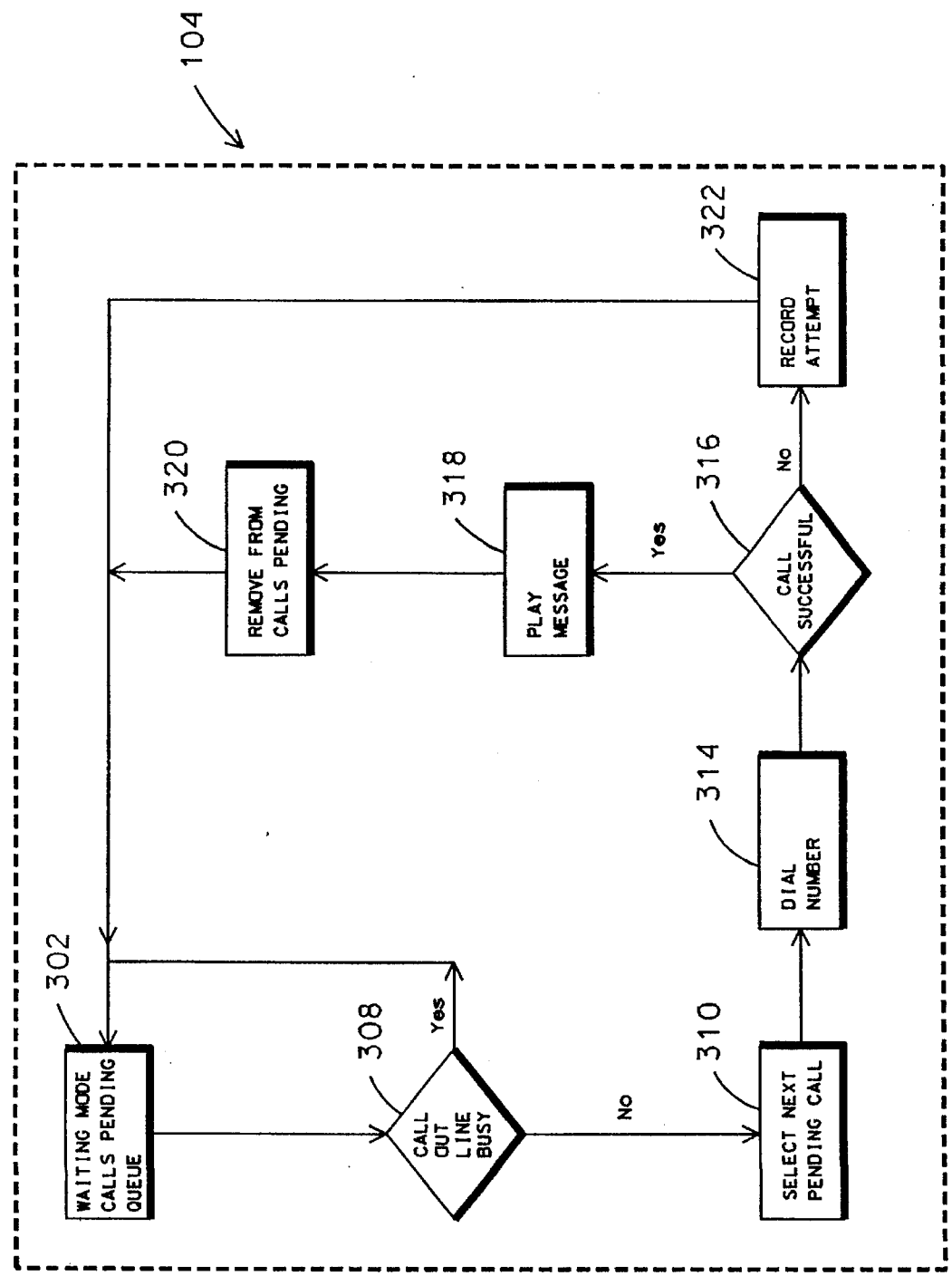
FIG. 3 illustrates a logic flow chart of the call return procedure of the present invention.

The system which embodies the present invention may be utilized on either a single line telephone, a multi-line telephone or a multi-line telephone attached to a PBX. The use of this system has two basic phases: (a) storing information relating to unsuccessful telephone call attempts, and (b) automatic call retries of the stored telephone numbers.

Referring now to FIG. 1, a system, referred to generally by the numeral 100, is the subject of this invention. The system includes a control box 104 which houses the operative components of the system. A display panel 105 is attached to an outward face of the control box 104. The display panel 105 includes an alphanumeric display 107 and is adapted for mounting of additional displays if desired. The control box 104 is attached by an incoming telephone line 106 to a public telephone network, and by a telephone connector line 108 to a Touch Tone telephone 102. An output line 110 is provided for attachment of auxiliary equipment, such as printers and/or computer modems. Control of the system is accomplished by use of designated keys on the telephone keypad. A directory of the use of each control key would of course be furnished an operator of the system. It is apparent that control keys located on a separate panel, such as panel 105, could also be utilized for parameters selection which are desired for operation of the system, if desired. The several operational functions and modes of the system are categorized and described in detail hereinafter.

Set up options

As previously noted the control box 104 has a user interface that utilizes a display 107 and the telephone 102 that is connected to the box. In order to start the set up process, the user picks up the telephone handset. The control box 107 has commercially available line current detectors that sense the current from the telephone company central office switch (the switch). When the handset is lifted, a closed path from the telephone to the switch is created allowing current to flow. The line current is detected by the line current detectors found in the telephone network interface 418. When the handset is lifted and the control processor 402 begins monitoring for DTMF (dual tone multi-frequency) tones from the Touch Tone telephone 102 which are detected by the digital processor 414. A user programmable sequence of digits will be used as an activation sequence to begin a command mode where options can be entered. For example, the # key may be used to start the command mode. Following the activation sequence, a list of menu items will be displayed on the display 107 which can be selected by entering digits on the telephone. The menu selections will be detected using the DTMF detector in the digital processor 414 mentioned above. As an example, one option which may be setup is the length of time to wait after an unsuccessful call attempt before the system tries that call again. Two timers may be stored in the parameters storage and queue 422; a standard wait, and a priority wait. The standard wait can be used for ordinary messages and the priority wait could be used for urgent messages.

To Record a Standard Message

Referring again to FIG. 1—the user selects a line on the telephone 102 and presses a designated key on the telephone to activate the control box 104 to record a message. The selected message may be indicated by a menu, readable from the alphanumeric display 107 on the panel 105. Thus, the display 107 serves as a "help" screen to aid the operator. However, the system will function normally without this feature. More specifically, when the user presses a key, designated to activate the control box 104, a control processor 402, as illustrated in FIG. 4, directs a relay 404 to disconnect a selected line temporally from the public switching network 408 and connects the telephone to the SLIC 410 and to the CODEC 412. The SLIC 410 provides power to the telephone and the CODEC performs an A/D and D/A conversion. By providing a tone played into the receiver and a message in the system display, the control processor 402 prompts the user to speak a message. The CODEC 412 receives the message and converts it into a pulse code modulated (PCM) digital string and sends it to the digital processor 414 for compression. The digital processor 414 sends the compressed message to control processor 402, which in turn sends it to the calls data storage 416. When the message record process is finished, the selected line is automatically connected back to telephone service and the digital processor 414 starts sensing a selected telephone line again.

Adding calls to message pending queue

Referring to the flow chart as illustrated in FIG. 2, a telephone user 200 attempts to place a telephone call 202. As indicated by block 203, if the call is successful the user talks with the recipient 204, and completes the call 206; if the call 202 is not successful, the user proceeds to the operations as illustrated within block 210. As indicated by the block 210 these actions include simply pressing a designated key on the telephone keypad and hanging up the telephone. The key referred to in the action block 210 is a designated key on the telephone key pad. Pressing a designated key activates control box 104 which stores telephone call data 212 which data typically includes the telephone number called, the date, the time, a personal or standard message, and the desired time period between retries of the call. This data has been automatically fed to the control box 104 in a manner which will be described in detail hereinafter. As the telephone hand set is lifted the line current detectors are used to detect the telephone going off-hook and the line is then monitored for DTMF tones using the DTMF detector in the digital processor 414. As the user dials the telephone number, each digit is detected as a DTMF tone by the digital processor 414 and stored by the control processor 402. While the digits are being detected, the control processor monitors for the activation sequence and line current. If the line current detector in the digital processor shows that the current has stopped, this signals that the handset has been hung up and the call terminated before the user tried to store a message. The system will then restart its original sequence. If the activation sequence is detected, this signals the control processor that the user wishes to associate a message with this particular telephone number. The control processor 402 is then prompted to store the outgoing number in the calls pending queue which is within the parameters storage 422, along with the time and date from the system real time clock 406. The control processor 402 will then disconnect the telephone from the telephone line by switching the relay 404. The call to the telephone company is now terminated by the switch since the line current is interrupted. The SLIC 410 will now power the telephone while the message is being recorded. The control processor 402 will then display a choice on the display 107 which will allow the user to select a custom or standard message by pressing a designated key on the telephone 102. The message type will then be selected by pressing the designated key on the telephone. If a standard message is selected then the control processor will associate a prerecorded message to be sent to this telephone number. If a custom message is selected then the control processor 402 will begin recording the custom message for this telephone number. The CODEC 412 receives the message and converts it to a PCM digital string and sends it to the digital processor 414 for compression. The digital processor 414 sends the compressed message to the control processor 402, which stores it in calls data storage 416, and the message notation for the queued call is changed from standard to custom. The control processor 402 will send a message to the display 107 to ask the user to enter the standard or priority timer choice for this call when the message is finished. When the control processor 402 detects the DTMF tone for the standard or priority timer choice then the message is complete and the control processor 402 enters command mode as previously described. When the user then presses the flash hook or hangs up the telephone, the control processor 402 stores the completed message and retry rate in the calls data storage 416 and in the parameter storage 422. The selected line is then connected back to telephone service, and the digital processor 414 senses a selected telephone line again.

It should be noted that generic introductory and closing messages can be stored to be played at the beginning and end of each call. The message can be entered by entering the activation sequence, taking the appropriate path through the LCD menu tree, selecting the message type, and recording the message through the telephone handset. These generic messages can be sent with each call that is stored.

When a call is not successful and the user has activated the system by pressing a designated key on the telephone keyboard, the automated call return system of the present invention will, repeatedly recall the originally dialed telephone number.

SENDING A STORED MESSAGE

Each stored call has a call timer stored in parameters storage and queue 422. The control processor decrements these call timers once each minute for each stored call. When a particular calls timer has timed out, the control processor 402 uses the line current detector to determine if the telephone handset is on-hook to see if the telephone line is available to send the call. If the telephone is on-hook the line is available and the control processor 402 proceeds to place the recall. If the telephone is off-hook, the control processor 402 will wait one minute and check again. When a line is available the control processor creates a closed path back to the switch by activating an optocoupler, in the telephone network interface 418 thus allowing current to flow back to the switch. This signals that the system is ready to place a call. The control processor then monitors the digital processor energy detector for an energy level that would exceed a typical dial tone level. A −25 dB signal may be used as the threshold level for the dial tone. The dial tone signals that the switch is ready for the telephone number. The control processor 402 then retrieves the telephone number for this call from parameters storage and queue 422 and sends each digit to the digital processor 414 in the form of a command. The digital processor responds to this command by generation of an appropriate DTMF tone thus dialing the number through the telephone network interface 418. Once each of the digits has been sent the control processor 402 waits for a ringing or busy signal. A ringing or busy signal will be detected using the energy detector in the digital processor 414. Typically a busy signal is on for 0.5 seconds and off for 0.5 seconds. A ringing signal is on for 2 seconds and off for 4 seconds. An energy level threshold of −40 dB may be used for the busy or ringing "on" signal. The control processor then waits for the ringing or busy energy level to be exceeded. If the level has not been exceeded after approximately ten seconds the attempt is considered a failure and the call is returned to the pending call queue. When a call is returned to the queue, the control processor 402 reloads the call timer and increments the number of attempts made for this call. If the energy level threshold of the "on" signal is exceeded the control processor 402 will continue to monitor the energy level and time how long the ringing/busy threshold has been exceeded. When the energy level drops below the threshold, the control processor compares the "on" time to 0.5 seconds. If the time does not exceed 0.5 seconds then the line is busy and the call is returned to the queue. If the time exceeds 0.5 seconds then the line is ringing and the control processor 402 will continue to monitor the energy level to determine when the far end has answered. If the energy is below the threshold (ring off) for more than 4 seconds, then the far end has answered. If the energy level is above the threshold for a burst less then 2 seconds, then the far end answered in the middle of a ring. If the "2 seconds on, 4 seconds off" cadence continues for more than the predetermined maximum allowable rings then the call is returned to the queue and the control processor 402 places a new last try time/date in the call pending queue and increments a call re-try counter for the queued call. This count may be viewed from the display or an auxiliary component such as a printer. The user may view the calls pending, and or the number of attempts by pressing a designated key on the telephone keypad. If the far end has answered the control processor begins playing the message for the call while monitoring for an answering machine tone. Echo cancelers in the digital processor 414 allow the digital processor to play a message while monitoring for the answering machine tone. When the control processor 402 detects a drop in return energy level, it plays an introductory message first, then it takes the standard message from memory or the personal message it has retrieved from calls data storage 416 associated with this code and sends it to the digital processor 414. The digital processor 414 decompresses the message and passes it to the CODEC 412 which converts it to analog form and sends it to the answered telephone by way of a typical telephone network interface 418. The control processor 402 continues to listen to the returned signal. If the control processor 402 detects a dropped line prior to the end of the message, it will note an unsuccessful message playback. At the end of the message, the control processor 402 plays a standard prerecorded ending message from call storage 416 instructing the listener to either press a key to repeat the message or to hang up, using the same message play sequence as described previously. If the control processor 402 detects either a DTMF tone, indicating the pressing of a key, or a voice, it replays the message and plays the instructions again. When the control processor 402 senses a drop of the line, it creates a new message code that contains the original telephone number, time/date of original try, time/date of the successful try, number of retries, a note of whether a human or machine answered, and whether the message was successfully played. The control processor 402 stores the code in the calls parameter storage 422, and deletes the successful call from the calls pending Queue within the parameter storage 422. If no answering machine tone is detected, the message will be repeated once. If an answering machine tone is detected during playback, the playback will be started over and the call will be flagged in the parameters storage and queue 422 as being answered by a machine by the control processor 402. If no tone is detected, the control processor will flag the call as being answered by a person. It is to be noted that the answering machine tone will be detected using a conventional signal-to-noise routine utilizing the energy detectors of the digital processor 414. If the recall is successful the system will play a recorded message to the recipient of the call. When the control processor 402 determines that selected parameters such as the allowed times of day, etc., are within the proper ranges, it repeatedly places the selected calls. Referring now to FIG. 3, data relating to calls which have been selected for return will be placed in a calls pending queue which is included within block 302. Then, as indicated by block 308, if the designated outgoing calling line is not busy, the control processor 402 selects the next pending call 310. The control processor 402 dials the selected number, as illustrated by block 314, and waits for the telephone to answer, see block 316. If the telephone answers, a selected message is played as indicated at block 318, the call is removed from the calls pending queue as illustrated by block 320, and the system returns to the waiting mode-calls pending 302 (hereinafter referred to as the "waiting mode"). Referring again to block 316, if the call was not successful, a play attempt 322 is recorded, the attempt time is noted, the telephone number remains in the call pending queue and the system returns to the waiting mode.

In describing the components of the system more specifically, reference is made to FIG. 4, wherein the components of the system are illustrated. It will be noted that communication between the components illustrated therein is accomplished by means of a data bus 401. A Touch Tone telephone 102 controls operation of the system by use of key pad commands designated for actuation of the automated features of the system. A relay 404 is a conventional 2-form C relay which is utilized to alternatively connect the telephone 102 to the public switching telephone network (PSTN) 408 or to a subscriber line interface circuit (SLIC) 410. The SLIC 410 (such as an AT&T part number ATT7551) provides an interface when control box 104 is connected to the telephone 102. The SLIC 410 also provides line current to telephone 102 and detects when telephone 102 is off-hook or on-hook. A telephone network interface 418 includes a transformer, such as is available as part number 671-8001 from "Midcom" and conventional components including, a 1-form A relay, and various discrete components for impedance matching and transient suppression. The interface 418 is used to connect to the conventional public switching network 408, and to monitor DTMF tones from telephone 102, when the telephone 102 is off-hook. A CODEC-filter 412 contains an analog to digital converter, a digital analog converter and required filters, and serves as a communication medium alternatively between digital processor 414 and either the telephone network interface 418 or the SLIC 410. A conventional serial port controller 424 contains RS-232 level drivers and receiver, and a connector for providing system information to auxiliary components such as a printer or computer modem which may be attached to the system via the output line 110. The display 107, which may be a conventional 2 line by 16 character alphanumeric Liquid Crystal Display (LCD), is utilized to provide helpful information to the user. A calls data storage 416 includes a conventional array of 1M×4 dynamic RAM chips which is used to store compressed voice from the digital processor 414. A conventional real time clock 406 (such as model DS1202 available from "Dallas Semiconductor") keeps the system real time information, such as the time, date, month, and year. A digital processor 414 (such as the DS 2132A, available from "Dallas Semiconductor") is a signal processor capable of voice compression and decompression, DTMF detection and generation, and detection of received energy levels. Parameters storage 422 utilizes a conventional 8k×8 static RAM for storage of information relating to the calls pending queue and to other operational functions of the system. A control processor 402 of conventional design (such as the 80C31 micro controller available from INTEL) is an 8 bit micro controller that is used for basic control of the system. The control processor 402 receives decoded DTMF tones from digital processor 414 and makes decisions as to whether they signify a telephone number or the operation of system control keys. The control processor 402 directs the digital processor 414 to record messages, stores the compressed data in the calls data storage 416, and stores recorded message information in the parameter storage 422. The control processor 402 contains all messages for the display 107. By use of conventional circuitry the processor 402 monitors the real time clock 406, and determines when it is time to return a call. The control processor 402 controls the telephone network interface 418 and commands the digital processor 414 to dial out the DTMF digits. In addition, the control processor 402 provides signal recognition functions when a call reaches its destination telephone. In performing these functions, the processor 402 monitors energy levels from the digital processor 414 during the return call process and makes a decision as to whether the destination telephone is ringing or busy, based on the time period during which energy is detected. When the destination telephone answers, the control processor 402 will monitor the receive level read from digital signal processor 414. The control processor 402 will wait a fixed period of time after the telephone is answered or until the receive level indicates silence on the answer end of the telephone and will begin the playback of the message. As is typical in digital signal processors utilized in digital telephone answering systems, digital signal processor 414 employs a conventional echo canceler in the receive path to enable it to continue to report the receive level during playback of the message. During the wait time, or during playback, the control processor 402 establishes a base level which is the lowest level received since the call has been answered. If a constant receive level above this base level is detected for a period of time, control processor 402 will accept this as detection of the tone (beep) which is the standard answering machine signal for a caller to begin leaving a message. If the tone detection takes place during playback, the message will restart to assure the full message will be recorded by the answering machine at the appropriate time during which the answering machine is recording.

Printing of the Calls Pending or Calls Completed Lists

When a user wishes to print a list of all calls pending or all calls completed since the last request to print, he/she presses an appropriate button on the telephone keypad to activate an auxiliary printer or modem which may be connected to a serial port interface 424 via output line 110. The control processor 402 retrieves all codes from the appropriate portion of calls data storage 416 and formats the output, sending it to the serial port controller 424. After printing the calls completed list, the codes which represent these calls are erased from calls data storage 416. Printing the calls pending lists has no effect on the list.

Thus it is understood that a preferred embodiment of the present invention is disclosed which achieves the objectives of the invention as set forth above. However, it should be appreciated that this invention may be implemented in types of equipment other than those disclosed. Variations may also be made with respect to the best mode of practicing this invention without departing from the scope of the invention as set forth in the appended claims.

What is claimed is:

1. A telephone system including an automatic telephone recall apparatus attached to and controlled by a Touch Tone telephone having operating keys capable of providing DTMF tones, said telephone system comprising:

numbers recording means for recording a plurality of telephone numbers as each of said telephone numbers is dialed during the placing of respective telephone calls through a PSTN by a user of the telephone system;

storage means for sequentially storing selected of said telephone numbers by actuation of said operating keys;

voice recording means for recording a respective custom message dictated by the user of the telephone system after dialing of each of said telephone calls;

automatic recall means for placing a recall to each of said selected telephone numbers;

recognition means for automatic recognition of the results of each said recall so as to recognize whether each respective recall was unanswered or answered and if answered to further recognize whether each respective answered recall was answered by a person or by an answering machine;

return means for return to said storage means the telephone number of each unanswered recall for later recall;

processor means for providing the respective custom message to the associated telephone number of the person or answering machine reached during each answered recall;

deletion means for deleting the stored number of each answered recall from said storage means; and indication means for indicating completion of each answered recall, and of the placement of each unanswered recall.

2. A telephone system a set forth in claim 1 wherein said voice recording means for recording said respective custom messages includes said telephone, a telephone interface, a relay, a SLIC, a CODEC, a digital processor, a control processor and data storage means.

3. A telephone system as set forth in claim 2 wherein selected actuation of said operating keys switches said telephone from said PSTN to said SLIC by operation of said relay whereby said custom messages are recorded by said voice recording means for later replay.

4. In an automatic telephone recall apparatus controlled by a DTMF Touch Tone telephone wherein a telephone number is dialed through the PSTN by a subscriber using the telephone to place a call to the telephone number dialed, a method for automatic recall of said number dialed, and for providing a selected message to the number dialed, said method comprising the steps of;

for each of plural telephone numbers dialed;
   a) activating a storage means without hanging up the telephone to store the number dialed when the call is not answered or busy;
   b) recording a message corresponding to said telephone number stored which was called but not answered;
   c) automatically placing a recall to said telephone number stored and associated with the respective recorded message;
   d) automatically recognizing whether the recalled number has been unanswered or answered by person or answering machine;
   e) returning to storage the recalled number which was recognized as unanswered;
   f) matching the respective recorded message with the associated recalled number such that upon the recall being answered, the respective recorded message is delivered; and deleting each stored number corresponding to recalls which have been answered;

providing an indication for indicating completion of each answered recall and placement of each unanswered recall.

* * * * *